United States Patent
Kallio

(10) Patent No.: US 6,695,395 B2
(45) Date of Patent: Feb. 24, 2004

(54) CONNECTION FOR A GRILL PANEL OF A MOTOR VEHICLE

(75) Inventor: Mikko Kallio, Hölö (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/312,192
(22) PCT Filed: Jun. 6, 2001
(86) PCT No.: PCT/SE01/01254
  § 371 (c)(1), (2), (4) Date: Dec. 17, 2002
(87) PCT Pub. No.: WO01/98132
  PCT Pub. Date: Dec. 27, 2001

(65) Prior Publication Data
US 2003/0094834 A1 May 22, 2003

(30) Foreign Application Priority Data
Jun. 21, 2000 (SE) .............................................. 0002312

(51) Int. Cl.⁷ .................................................. B60J 5/04
(52) U.S. Cl. ............. 296/202; 296/146.11; 296/146.12; 296/193.1
(58) Field of Search .................................. 296/191, 192, 296/194, 202, 146.1, 146.8, 146.11, 146.12, 193.1; 180/69.2

(56) References Cited

U.S. PATENT DOCUMENTS 4,291,501 A   9/1981   Steiberg et al. ................ 49/386
6,000,748 A  12/1999   Tomforde et al. ........... 296/202

FOREIGN PATENT DOCUMENTS

DE   19809778   7/1999
FR    2684950   6/1993

Primary Examiner—Dennis H. Pedder
Assistant Examiner—Jason Morrow
(74) Attorney, Agent, or Firm—Ostrolenk, Faber, Gerb & Soffen, LLP

(57) ABSTRACT

Connection for a grill panel (10) of a motor vehicle, incorporating a pair of mountings for the grill panel. To provide a safe and dimensionally stable connection for the grill panel, it is proposed, inter alia, that each mounting be associated with a hinge (20; 30) for a side door of the vehicle.

18 Claims, 1 Drawing Sheet

CONNECTION FOR A GRILL PANEL OF A MOTOR VEHICLE

TECHNICAL FIELD

The invention relates to a connection for a grill panel of a motor vehicle, incorporating a pair of mountings for the grill panel.

STATE OF THE ART

Known grill portions of freight vehicles often have not only a grill panel with radiator grille but also further covering elements. The grill panel usually requires several connection points arranged for the purpose in the vehicle's chassis so that the panel can be locked to and, when necessary, raised up from the vehicle's front.

SUMMARY OF THE INVENTION

One object of the invention is to provide a grill panel which can be allowed to cover a major portion of the vehicle's front and can at least partly be connected at pre-existing connection points on the vehicle.

The hinge brackets, which are already dimensioned for the relatively large loads arising from the side doors, enable stable connection of the grill panel, which may therefore be dimensioned to cover a major portion of the vehicle's front and avoid the need for further covering elements or bodywork components. In particular, grill panel sides angled rearwards may extend all the way to the front edges of both side doors, where the common hinge connections may delineate the intermediate gaps with great dimensional accuracy.

In the preferred embodiment, each mounting is associated with a hinge element which is fastened to the vehicle. This simplifies assembly work in that hinges and panel mountings can be fitted in a single operation.

In the preferred embodiment, an upper pair of mountings are also pivot brackets which make it possible to pivot the grill panel upwards. A lower pair of mountings are positional retainers in the form of elongate hinge pins which determine the lateral position of the grill panel so that its sides adjoin the side doors in a planar manner.

Further mountings may optionally be arranged to lock the grill panel to the front of the vehicle.

BRIEF OF DESCRIPTION OF THE DRAWINGS

DESCRIPTION OF AN EMBODIMENT

Figure 1:
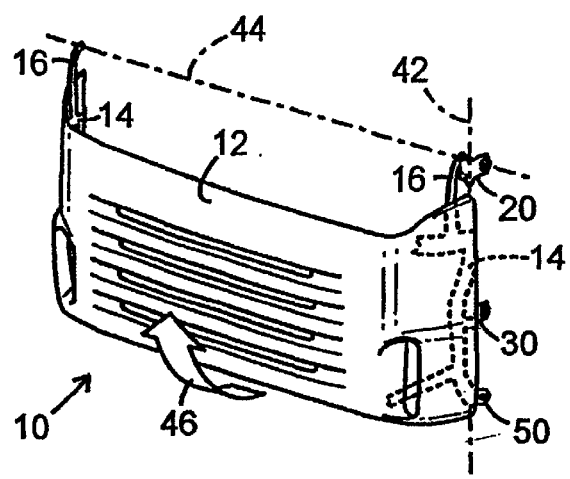
FIG. 1 depicts a grill panel according to the invention.

The grill panel 10 depicted in FIG. 1 incorporates an apertured housing 12 which via an only partly depicted supporting frame 14 is connected, pivotably upwards, to a front portion of an undepicted motor vehicle, particularly a freight vehicle. More specifically, the panel 10 is pivotable upwards in a known manner in the direction of the arrow 46 about an axis 44 from the depicted lowered position to a raised position to allow maintenance and repair of the vehicle.

Figure 2:
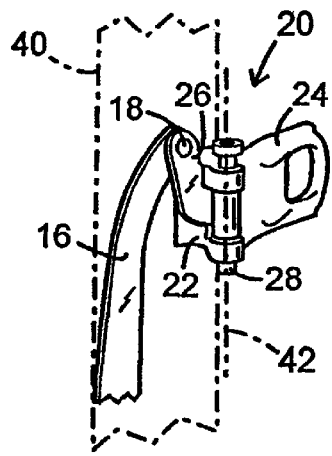
FIG. 2 depicts on a larger scale an upper pivot connection for the grill panel in FIG. 1.

A pair of hinge arms 16, 16 connected to the supporting frame 14 protrude upwards from the upper ends of the rearwards-angled sides of the grill panel 10. This keeps the upper edge of the grill panel 10 clear of the vehicle's undepicted windscreen and other parts of the vehicle's front situated above when it is pivoted up to the raised position. As particularly indicated in FIG. 2, the free end of each hinge arm 16 is supported for pivoting via a bearing 18 on a mounting in the form of a pivot bracket 26 which protrudes forward. According to the invention, the pivot bracket 26 is anchored (e.g. welded or screwed) to or manufactured integrally with the element 22 of an upper door hinge 20. The element 22 is fastened in a conventional manner to the vehicle's A-pillar 40 and supports the upper elements of the hinge 20, i.e. a hinge pin 28 and the hinge element 24 which supports the vehicle's undepicted side door for pivoting about the axis 42 defined by the pin 28.

Figure 3:
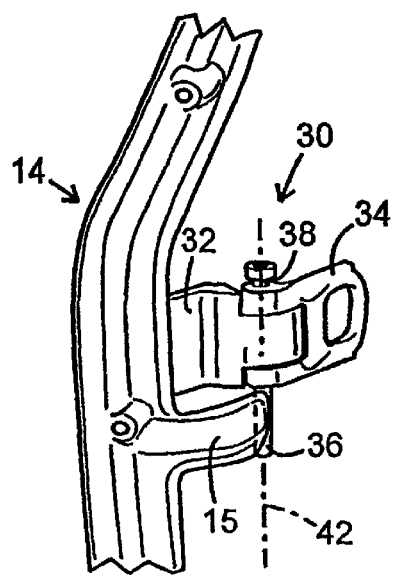
FIG. 3 depicts likewise on a larger scale a lower position-fixing connection for the grill panel in FIG. 1.

The lower door hinge 30 depicted in FIG. 3 has likewise an element 32 fastened to the vehicle, a hinge pin 38 and a pivotable hinge element 34. An extension 36 of the hinge pin 38 protrudes downwards from the hinge 30. A protrusion 15 bent rearwards on an adjacent part of the supporting frame 14 is arranged to engage with the extension 36. More specifically, the extension 36 serves as a fixed mounting or lateral guide for the laterally relatively flexible grill panel 10 when the inside of the protrusion 15 engages with the outside of the fixed extension 36. This makes it possible for the angled side of the grill panel 10 and the adjacent undepicted side door to adjoin one another in a planar manner with great precision. The fixed extension 36 preferably engages in only guiding unilateral abutment against the protrusion 15, but it is also possible to provide the protrusion 15 with undepicted stop or snaplock devices or the like which respectively define an end position and bring about more positive locking of the grill panel 10 to the hinge 30.

In the preferred embodiment, positive locking of the grill panel 10 to the vehicle is achieved by means of a pair of fastening lugs 50 (only one of them depicted in FIG. 1) arranged at the opposite lower ends of the supporting frame 14. Each fastening lug 50 is connected, e.g. by a threaded connection, to a mounting/fastening point in the vehicle's chassis (not depicted). Within the scope of the invention, it is nevertheless conceivable to connect a possibly smaller grill panel at the four hinges only.

The grill panel 10 need not necessarily be arranged for pivoting motion about the horizontal axis 44. Within the scope of the invention it is also conceivable, in a manner not depicted, for the grill panel 10 to be pivotable about the axis 42, by each of the two hinges for one of the side doors also having a movable hinge element for the grill panel. Each of the two hinges for the opposite side door may then be provided with mountings which lock the panel in the closed position.

Although the grill panel depicted and described is of the vertical type which hardly completes the vehicle's front, the invention may also be applied to grill panels of the engine bonnet type which protrude to a greater or lesser extent at the front of the vehicle (not depicted).

What is claimed is:

1. A connection for a grill panel of a motor vehicle, comprising:
   a vehicle hinge for a side door of a vehicle; the hinge includes an element which is fastened to the vehicle;
   a first and a second mounting for the grill panel, and each mounting is associated with the element of the hinge for a side door of the vehicle; and
   a first pair of the first mountings including pivot brackets for the grill panel and the pivot brackets protrude forward from the element fastened to the vehicle.

2. Connection according to claim 1, further comprising a respective hinge arm protruding upwards from the grill panel and supported for pivoting on each pivot bracket.

3. Connection according to claim 1, wherein the hinge is an upper hinge of the side door.

4. Connection according to claim 1, further comprising a second pair of the second mountings including positional retainers for the grill panel.

5. Connection according to claim 4, further comprising the hinge for the positional retainer includes an extension of a hinge pin of the hinge.

6. Connection according to claim 4, wherein each positional retainer is shaped and positioned to define a lateral position for the grill panel.

7. Connection according to claim 4, wherein the grill panel has an inside, each positional retainer is shaped and positioned to engage the inside of the grill panel.

8. Connection according to claim 7, further comprising a supporting frame for the grill panel, wherein the inside of the grill panel includes a portion of the supporting frame for the grill panel.

9. Connection according to claim 2, further comprising a pair of releasable fixed connections for the grill panel at a lower portion of the grill panel.

10. Connection for supporting a grill panel to the front of a vehicle comprising:
- a hinge for a vehicle door of the vehicle;
- separated upper and lower hinge mountings for the grill at the hinge;
- the upper mounting comprising a pivot bracket on the vehicle and a hinge arm protruding upward from the grill panel and pivotally supported to the pivot bracket; and
- the lower mounting being below the upper mounting and comprising a positional retainer for the grill panel.

11. Connection according to claim 10, wherein the positional retainer includes an extension of a hinge pin of the hinge.

12. Connection according to claim 10, wherein the grill panel has an inside, each positional retainer is shaped and positioned to engage the inside of the grill panel.

13. Connection according to claim 12, further comprising a supporting frame for the grill panel, wherein the inside of the grill panel includes a portion of the supporting frame for the grill panel.

14. Connection according to claim 10, further comprising a respective hinge at each side of the vehicle, a respective one of the upper and lower hinge mountings at each hinge.

15. The connection of claim 1, wherein the first pair of first mountings are separated across the grill and the pivot brackets are so positioned with respect to the grill and the vehicle that the grill is pivotable upward and downward around a horizontal axis.

16. The connection of claim 10, comprising a pair of the upper mountings on the grill which are spaced apart across the grill and defining a horizontal axis about which the grill is pivotable.

17. A connection for a grill panel of a motor vehicle, comprising:
- a hinge for a side door of a vehicle;
- a first and a second mounting for the grill panel, and each mounting is associated with the hinge for a side door of the vehicle, wherein the hinge includes an element which is fastened to the vehicle; each mounting is associated with the element of the hinge;
- a first pair of the first mountings including pivot brackets for the grill panel and the pivot brackets protrude forward from the element fastened to the vehicle; and
- one of the first and second mounts for the grill panel is a pivot mounting so connected with the grill panel that the grill panel can pivot around one of the mountings with respect to the vehicle between different pivot positions for the grill panel.

18. Connection for supporting a grill panel to the front of a vehicle comprising:
- a hinge for a vehicle door of the vehicle;
- separated upper and lower hinge mountings for the grill at the hinge;
- the upper mounting comprising a pivot bracket on the vehicle and a hinge arm protruding upward from the grill panel and pivotally supported to the pivot bracket so that the grill panel can pivot around the upper mounting with respect to the vehicle between different pivot positions for the grill panel; and
- the lower mounting being below the upper mounting and comprising a positional retainer for the grill panel.

* * * * *